(12) United States Patent
Morvant et al.

(10) Patent No.: US 9,010,680 B2
(45) Date of Patent: Apr. 21, 2015

(54) PYLON FOR ATTACHING A GAS TURBINE ENGINE

(75) Inventors: Romuald Morvant, Tamworth (GB); Kevin M. Britchford, Belper (GB)

(73) Assignee: Rolls-Royce plc, London (GB)

( * ) Notice: Subject to any disclaimer, the term of this patent is extended or adjusted under 35 U.S.C. 154(b) by 706 days.

(21) Appl. No.: 13/162,049

(22) Filed: Jun. 16, 2011

(65) Prior Publication Data

US 2012/0001019 A1    Jan. 5, 2012

(30) Foreign Application Priority Data

Jul. 1, 2010    (GB) .................................. 1011056.7

(51) Int. Cl.
   *B64D 29/02*    (2006.01)
   *B64D 29/06*    (2006.01)
   *B64C 7/02*    (2006.01)
   *B64D 33/04*    (2006.01)

(52) U.S. Cl.
   CPC . *B64D 29/02* (2013.01); *B64C 7/02* (2013.01); *B64D 33/04* (2013.01)

(58) Field of Classification Search
   CPC .......... B64C 1/16; B64D 27/26; B64D 29/06; B64D 2027/26
   USPC ...................... 244/53 R, 54; 60/796; 248/554
   See application file for complete search history.

(56) References Cited

U.S. PATENT DOCUMENTS

| | | | |
|---|---|---|---|
| 4,238,092 A | 12/1980 | Brennan | |
| 5,755,092 A * | 5/1998 | Dessale et al. | 60/262 |
| 6,179,249 B1 | 1/2001 | Canadas | |
| 6,378,804 B1 | 4/2002 | Cambon | |
| 8,322,652 B1 * | 12/2012 | Stretton | 244/54 |
| 2010/0051744 A1 | 3/2010 | Bonnaud et al. | |

FOREIGN PATENT DOCUMENTS

| | | | | |
|---|---|---|---|---|
| EP | A0075686 | 4/1983 | | |
| FR | 2 898 336 A1 | 9/2007 | | |
| FR | 2 921 342 A1 * | 3/2009 | | B64D 29/06 |
| GB | 2 390 345 A | 1/2004 | | |
| WO | WO 95/17334 A1 | 6/1995 | | |
| WO | WO 2007/113183 A1 | 10/2007 | | |

OTHER PUBLICATIONS

Search Report issued in British Application No. GB1011056.7 dated Oct. 19, 2010.

* cited by examiner

*Primary Examiner* — Rob Swiatek
(74) *Attorney, Agent, or Firm* — Oliff PLC

(57) ABSTRACT

A pylon for attachment of a gas turbine engine to a wing of an aircraft has a trailing edge which is rearward of the trailing edge of the core fairing and the trailing edge of the fan nacelle. The pylon has two laterally-spaced side faces which extend in the rearward direction of the engine to end at the trailing edge of the pylon. Each side face has a bottom edge which extends in a rearward direction of the engine from the core fairing to the bottom end of the trailing edge of the pylon. The bottom edges merge such that the bottom edges form a single bottom edge. The pylon is intended to exert control on the bypass flow of a gas turbine engine. Other pylons are also provided which can also exert such control.

9 Claims, 10 Drawing Sheets (a)  (b)  (c)

(a)  (b)

PYLON FOR ATTACHING A GAS TURBINE ENGINE

The present invention relates to a pylon for attachment of a gas turbine engine to the wing of an aircraft.

Aircraft noise is a major problem in the aircraft industry. Aircraft manufacturers are under continual pressure to reduce the amount of noise produced by aircraft, particularly during takeoff and landing. Significant noise can be caused by aircraft gas turbine engines. In particular, the downstream mixing of flow exiting from bypass and core sections of such an engine can generate jet noise.

Further noise can be generated due to various installation effects, especially for configurations in which a jet shear layer closely-couples to wing and/or flap surfaces. In particular, the proximity of the jet shear layer generated by the air leaving the engine to the wing and flap of the aircraft leads to acoustic pressure fluctuations that tend to propagate upstream of the wing. Although the noise generation mechanisms are not presently fully understood, it is apparent that the radiated noise from the interaction between the engine outflow and the wing flap is highly correlated with the shear layer strength.

Thus in order to reduce the noise generated by a gas turbine engine, it is desirable to exert control on the flow field of the air in the bypass or core duct of the engine.

A gas turbine engine is typically attached to e.g. the wing of an aircraft by a pylon. In a turbofan engine, the pylon spans the bypass duct formed between the fan nacelle and the core fairing of the engine to join the engine core to the aircraft. By spanning the bypass duct, the pylon interrupts the annular continuity of the duct and thus affects the flow field of the bypass air in and exiting from the bypass duct. As the pylon also typically extends rearwardly of the core engine exhaust nozzle formed by the core fairing, the pylon may also affect the flow field of exhaust gas exiting from the nozzle.

EP A 0075686 proposes a method for reducing drag in the airflow over the top forward section of a pylon and then beneath the wing of an aircraft. The pylon is designed to improve the flow of air over the engine.

Similarly, WO 2007/113183A1 and EP A 0735970 propose pylon designs for controlling the aerodynamics of the pylon and for reducing the drag caused by the presence of the pylon.

An object of the present invention is to exert control on the bypass flow of a gas turbine engine, in order to reduce the jet noise from the downstream mixing of the core and bypass flows and/or the installation noise caused by the interaction between the jet shear layer and the wing flaps of the aircraft.

Noise reduction can be achieved in a number of ways including deflection of the jet shear layer away from the wing flaps of the aircraft, reduction of the strength of the jet shear layer, enhanced mixing of the core and bypass flows and redistribution of the air flow in the vicinity of an attachment pylon for the engine.

In general terms, the present invention provides a pylon for attachment of a gas turbine engine to a wing of an aircraft, the gas turbine engine comprising a core fairing surrounding a core generator and defining a nozzle for discharging a core gas flow, and a fan nacelle surrounding the core fairing to define an annular bypass duct therebetween for discharging fan air;

wherein the pylon spans the bypass duct between the fan nacelle and the core fairing and extends in the rearward direction of the engine to end at a trailing edge which is rearward of the trailing edge of the core fairing and the trailing edge of the fan nacelle. The pylon can be then be configured in various ways to improve aerodynamics and/or decrease noise generation.

Typically, the trailing edge of the fan nacelle is forward of the trailing edge of the core fairing. However, in a long cowl engine, the trailing edge of the fan nacelle can be rearward of the trailing edge of the core fairing. Generally, the trailing edge of the pylon is aligned with the radial direction of the engine. The pylon may have two laterally-spaced side faces which span the bypass duct between the fan nacelle and the core fairing and extend in the rearward direction of the engine to end at the trailing edge of the pylon. The laterally-spaced side faces can have outwardly convex and/or concave regions, which can affect the airflow over the pylon.

In a first aspect, the pylon described above in general terms may have two laterally-spaced side faces which span the bypass duct between the fan nacelle and the core fairing and extend in the rearward direction of the engine to end at the trailing edge of the pylon, each side face having a bottom edge which extends in a rearward direction of the engine from the core fairing to the bottom end of the trailing edge of the pylon;

wherein the bottom edges merge at a merging position between the trailing edge of the fan nacelle and the trailing edge of the pylon such that the bottom edges form a single bottom edge from the merging position to the bottom end of the trailing edge of the pylon.

By merging the bottom edges in this way, efficient mixing of the flow on each side of the pylon can be achieved. In particular, an efficient change in the turbulence levels of the mixing flow can be achieved.

The pylon of the first aspect may have any one or any combination of the following optional features.

Typically, each bottom edge extends without substantial deviation in the radial direction of the engine from the core fairing to the bottom end of the trailing edge of the pylon.

Typically, the bottom edges merge at a merging position between the trailing edge of the core fairing and the trailing edge of the pylon.

The laterally-spaced side faces may have outwardly concave regions adjacent the bottom edges, and preferably adjacent the single bottom edge. This can decelerate the flow of air around the pylon. Conversely, the laterally-spaced side faces may have outwardly convex regions adjacent the bottom edges, and preferably adjacent the single bottom edge. This can accelerate the flow of air around the pylon. Indeed, the side faces may have concave and convex regions depending on the precise flow modification it is intended to achieve.

Preferably, the laterally-spaced side faces are outwardly concave adjacent the trailing edge of the pylon. By providing a concavity on each side in this region, the shear layer and the bypass flow on both side of the pylon can be merged at an angle determined by the shape of the pylon. This can lead to a weakening of the shear layer strength and a change in turbulence level of the bypass flow.

Indeed, in a second aspect, the pylon described above in general terms may have two laterally-spaced side faces which span the bypass duct between the fan nacelle and the core fairing and extend in the rearward direction of the engine to end at the trailing edge of the pylon;

wherein the laterally-spaced side faces are outwardly concave adjacent the trailing edge of the pylon.

The pylon of the first or second aspect optionally has one or more rearwardly extending channels formed on one or both of the side faces. These channels can e.g. encourage flow reattachment, improve mixing of the bypass and core flows, and/or divert flows over the pylon.

Thus, more generally, in a third aspect, the pylon described above in general terms may have two laterally-spaced side faces which span the bypass duct between the fan nacelle and the core fairing and extend in the rearward direction of the engine to end at the trailing edge of the pylon;

wherein one or more rearwardly extending channels are formed on one or both of the side faces.

The pylon of the first, second or third aspect optionally has any one or any combination of the following optional features.

The channels may be configured to divert fan air flow or free-stream air flow into the core gas flow. This can improve flow mixing.

Alternatively, a plurality of the channels can be formed side-by-side on one or both of the side faces, each channel having a maximum width of about 1 cm. These relatively narrow channels can promote flow reattachment.

Between the trailing edge of the core fairing and the pylon trailing edge, the pylon may have an underside projection which extends downwardly to impinge on the core gas flow discharged from the core duct. The projection can thereby increase shear and alter turbulence levels within the flow.

Indeed, in a fourth aspect, the pylon described above in general terms may have, between the trailing edge of the core fairing and the pylon trailing edge, an underside projection which extends downwardly to impinge on the core gas flow discharged from the core duct.

The underside of the pylon of the first, second, third or fourth aspect optionally has, between the trailing edge of the core fairing and the pylon trailing edge, a pair of laterally-spaced, rearwardly extending first ridges which define therebetween a rearwardly extending channel in the underside of the pylon. The ridges can alter the characteristics of the surrounding flow, which is typically the bypass flow.

Thus, more generally, in a fifth aspect, the underside of the pylon described above in general terms may have, between the trailing edge of the core fairing and the pylon trailing edge, a pair of laterally-spaced, rearwardly extending first ridges which define therebetween a rearwardly extending channel in the underside of the pylon.

The pylon of the first, second, third, fourth or fifth aspect optionally has any one or any combination of the following optional features.

Typically, the first ridges extend from the trailing edge of the core fairing to the pylon trailing edge.

Preferably, between the trailing edge of the core fairing and the pylon trailing edge, the pylon has one or more rearwardly extending further ridges, e.g. extending from the trailing edge of the core fairing to the pylon trailing edge. The further ridges can further alter the characteristics of the surrounding flow. More preferably, the pylon has at least one pair of the further ridges, the pair being laterally-spaced and defining therebetween a rearwardly extending further channel. For example, the further ridges can be nested between the first ridges.

The pylon trailing edge may form at least one rearwardly directed projection, or "chevron", between the top and the bottom ends of the pylon trailing edge. The projections can enhance the mixing between the bypass flows on either side of the pylon.

Indeed, more generally, in a sixth aspect, the trailing edge of the pylon described above in general terms may form at least one rearwardly directed projection between the top and the bottom ends of the pylon trailing edge.

The underside of the pylon of the first, second, third, fourth, fifth or sixth aspect optionally forms, between the trailing edge of the core fairing and the pylon trailing edge, a series of undulations which are spaced from each other in the rearward direction of the engine. These undulations can alter the bypass and core mixing.

Thus, more generally, in a seventh aspect, the underside of the pylon described above in general terms may form, between the trailing edge of the core fairing and the pylon trailing edge, a series of undulations which are spaced from each other in the rearward direction of the engine.

The pylon of the first, second, third, fourth, fifth, sixth or seventh aspect optionally has one or more openings on the external surface thereof for discharging air. The openings can be used to redistribute flow and/or to alter the flow characteristics around the pylon.

Indeed, more generally, in an eighth aspect, the pylon described above in general terms may have one or more openings on the external surface thereof for discharging air.

The pylon of the first, second, third, fourth, fifth, sixth, seventh or eighth aspect optionally has any one or any combination of the following optional features.

The openings can discharge the air into the fan air discharged by the annular bypass duct and/or the core gas flow discharged by the core duct.

The pylon may further have one or more passages which convey air from a compressor of the engine to the openings for discharge therethrough. Alternatively or additionally, the pylon may further have one or passages which convey air from entrance holes external of the engine (e.g. on the pylon external surface) to the openings for discharge therethrough.

Figure 8:
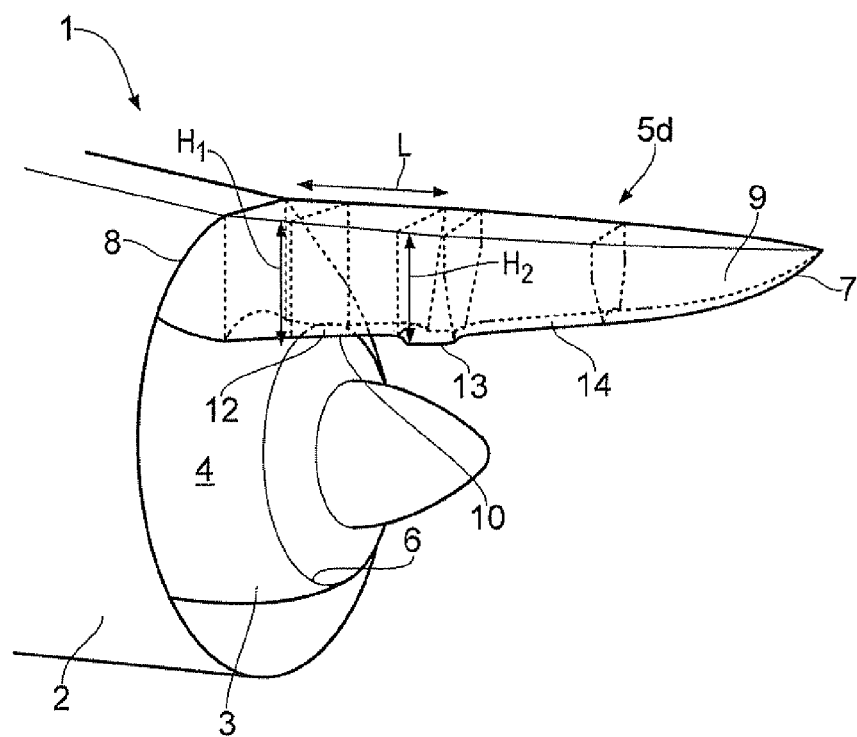
FIG. 8 shows schematically a gas turbine engine in which another pylon attaches the engine to a wing of an aircraft.
Figure 10:
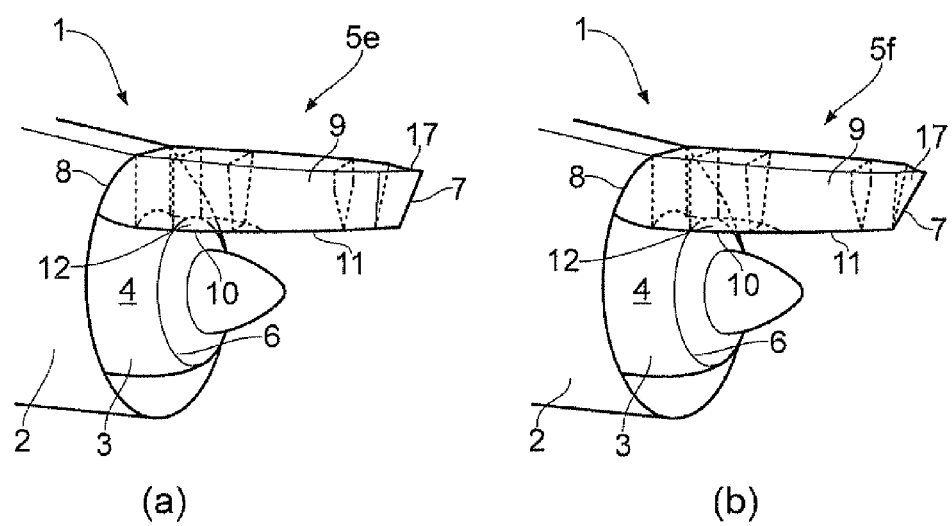
Figure 11:
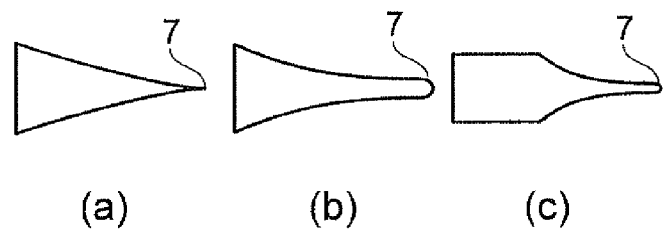
Figure 12:
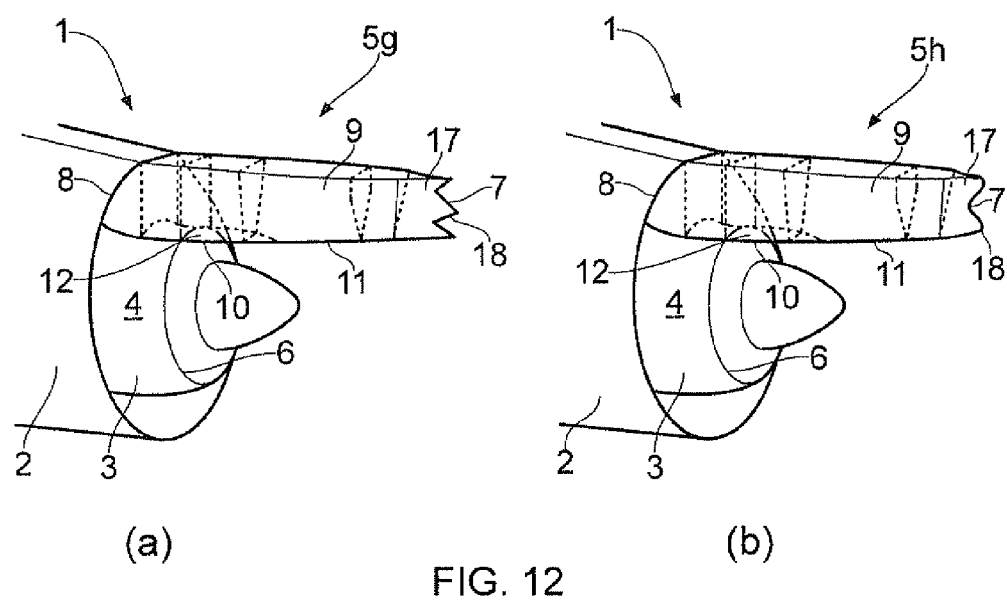
Figure 13:
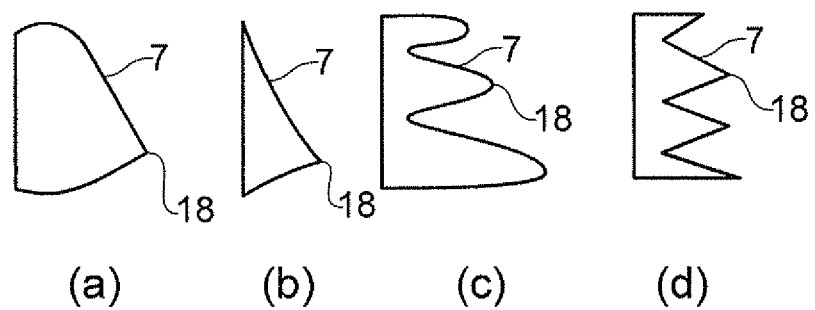
Figure 14:
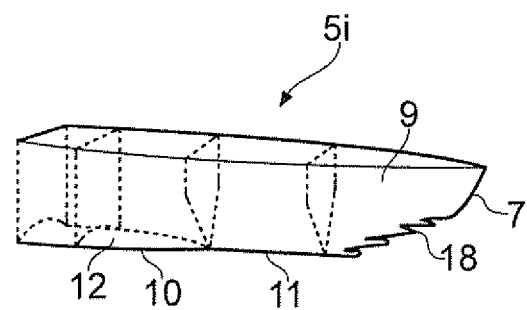
Figure 15:
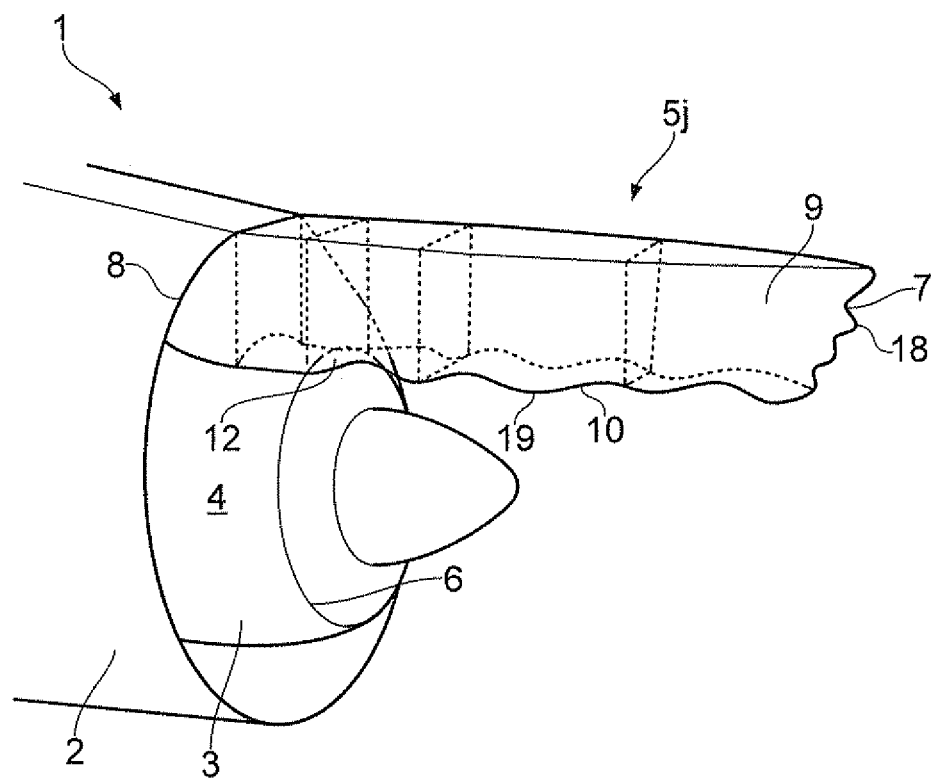
Figure 16:
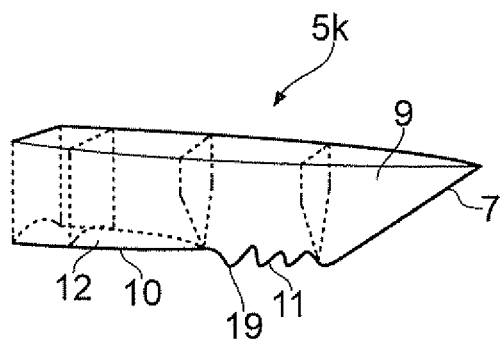
Figure 17:
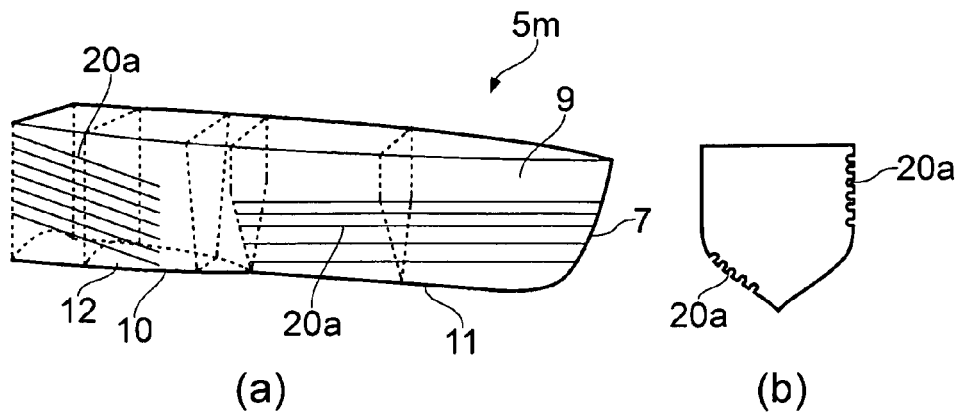
Figure 18:
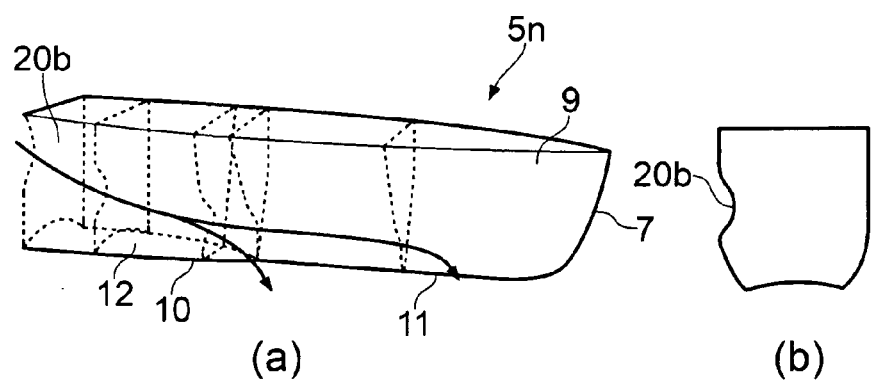
Figure 19:
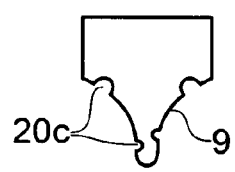
Figure 20:
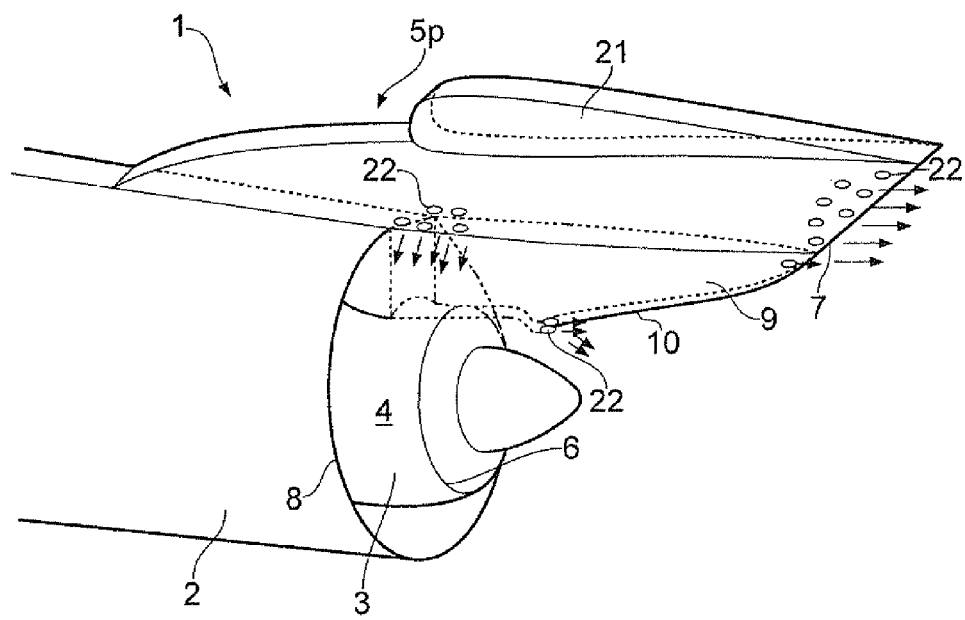
Figure 21:
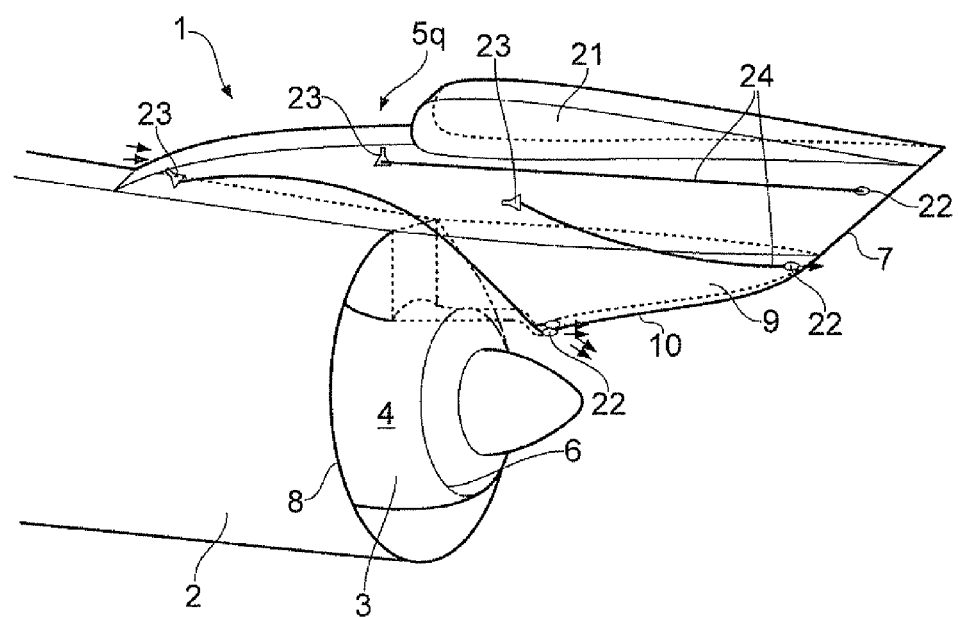

FIGS. 10(a) and (b) show schematically gas turbine engines in which further pylons attach the respective engine to a wing of an aircraft;

FIG. 11 shows possible top side views (a) to (c) of the tip region of the pylons of FIG. 10;

FIGS. 12(a) and (b) show schematically gas turbine engines in which further pylons attach the respective engine to a wing of an aircraft;

FIG. 13 shows schematically enlarged views (a) to (d) of possible trailing edges of the pylons of FIGS. 12(a) and (b);

FIG. 14 shows schematically the rear section of another pylon;

FIG. 15 shows schematically a gas turbine engines in which another pylon attaches the engine to a wing of an aircraft;

FIG. 16 shows schematically the rear section of another pylon;

FIG. 17 shows schematically (a) the rear section of another pylon, and (b) a cross-section through the pylon;

FIG. 18 shows schematically (a) the rear section of another pylon, and (b) a cross-section through the pylon;

FIG. 19 shows another possible cross-section of the pylon of FIG. 8;

FIG. 20 shows schematically a gas turbine engines in which another pylon attaches the engine to a wing of an aircraft; and FIG. 21 shows schematically a gas turbine engines in which another pylon attaches the engine to a wing of an aircraft.

In the following detailed description, corresponding features of the various embodiments discussed have the same reference numbers in all the Figures.

Figure 1:
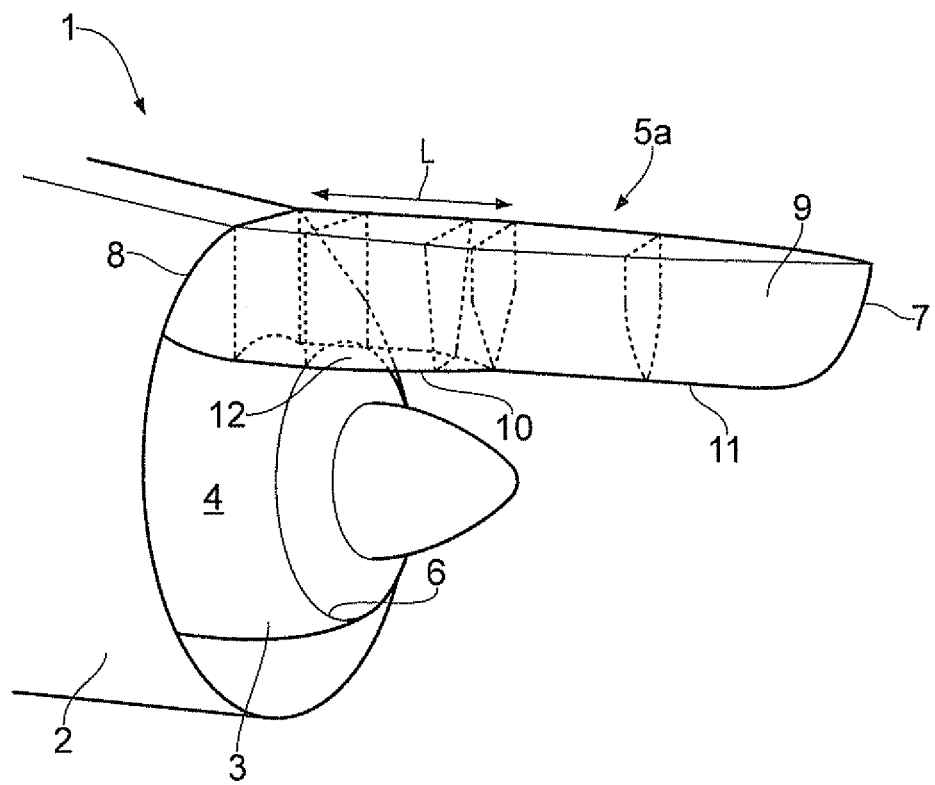
FIG. 1 shows schematically a gas turbine engine in which a pylon attaches the engine to a wing of an aircraft.

FIG. 1 shows schematically a gas turbine engine 1 in which a pylon 5a attaches the engine to a wing (not shown) of an aircraft. The engine has an annular bypass duct 4 defined between a fan nacelle 2 and a core fairing 3 for a flow of bypass air. Exhaust gas from the core generator of the engine exits the engine exhaust nozzle formed by the trailing edge 6 of the core fairing. The pylon has two laterally-spaced side faces 9 which span the fan nacelle and the core fairing and extend in the rearward direction of the engine beyond the trailing edge of the core fairing to end at a trailing edge 7 which is aligned with the radial direction of the engine. The upper part of the pylon, which extends and attaches to the wing, is not shown in FIG. 1.

From the trailing edge 8 of the fan nacelle to the trailing edge 6 of the core fairing, the pylon 5a has an approximately rectangular cross-section (indicated by dashed lines in FIG. 1). Rearwards from trailing edge of the core fairing, however, the cross-section becomes progressively more triangular, until at an axial distance L from the trailing edge of the fan nacelle, the bottom edge of the cross-section rectangle disappears. In other words, the bottom edges 10 of the side faces 9, which extend in a rearward direction of the engine from the core fairing to a radially inner end of the trailing edge 7 of the pylon, merge at the axial distance L to form a single bottom edge 11, which then continues on to the radially inner end of the trailing edge of the pylon.

Figure 2:
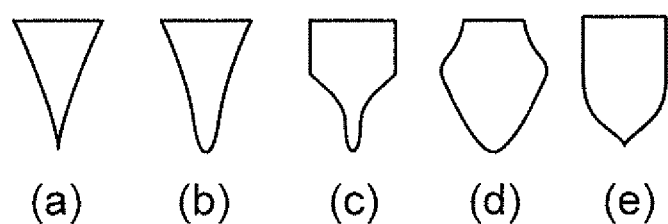
FIG. 2 shows possible cross-sections (a) to (e) of the pylon of FIG. 1.

By shaping the pylon 5a in this way, the flow of air around the pylon can be modified. In particular, if the side faces 9 are outwardly concave above the single bottom edge 11, as illustrated in the possible cross-sections (a), (b) and (c) of FIG. 2, then the flow around the pylon can be decelerated. Conversely, if the side faces are outwardly are outwardly convex above the single bottom edge, as illustrated in the possible cross-sections (d) and (e) of FIG. 2, then the flow around the pylon can be accelerated. Indeed, the side faces can have both concave and convex regions, the combination of both types of curvature enabling precise control of the flow field around the pylon. In this way, mixing of the core and bypass flows can be improved, leading to a reduction in jet noise.

Preferably, to enhance mixing, the distance L is greater than the distance between the trailing edge 8 of the fan nacelle and the trailing edge 6 of the core fairing. However, structural requirements may lead to a shorter distance L being selected.

Figure 3:
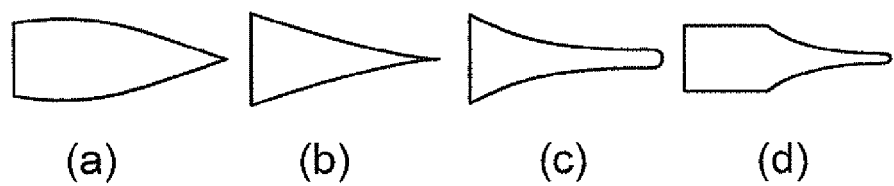
FIG. 3 shows possible shapes (a) to (d) of the bottom face of the pylon of FIG. 1.

Forward of the point of merger of the bottom edges 10, the bottom face 12 of the pylon can take various shapes, as illustrated in FIG. 3. In bottom faces (a) to (c), the bottom edges 10 converge together with distance from the trailing edge 8 of the fan nacelle 2 at respectively different rates. In bottom face (d), the bottom edges initially extend parallel to each other, before converging together.

Figure 4:
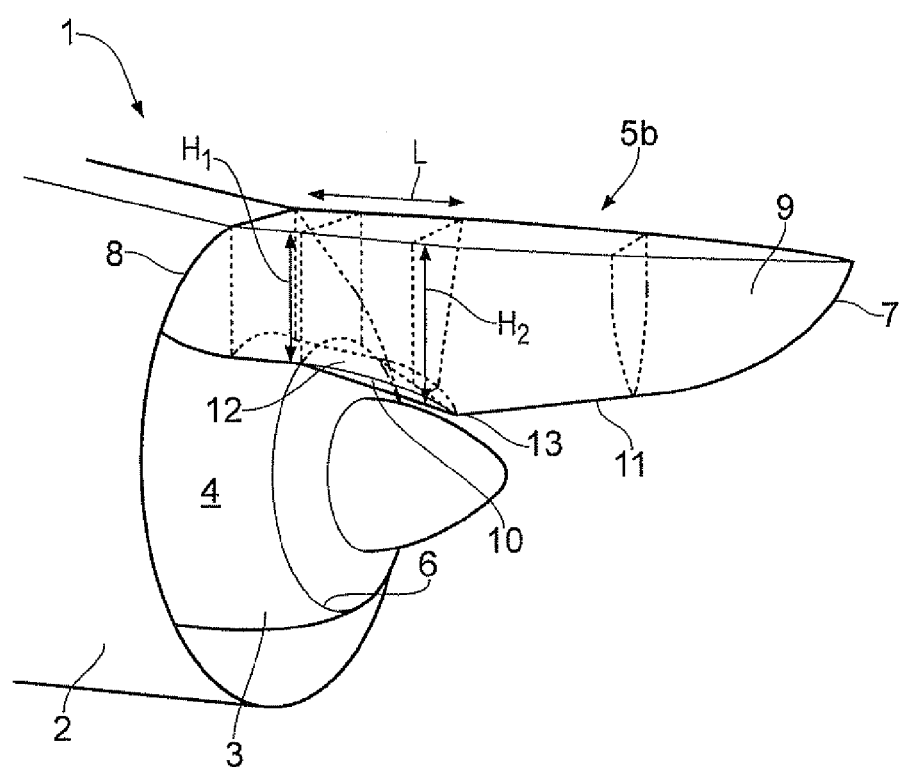
FIG. 4 shows schematically a gas turbine engine in which another pylon attaches the engine to a wing of an aircraft.
Figure 5:
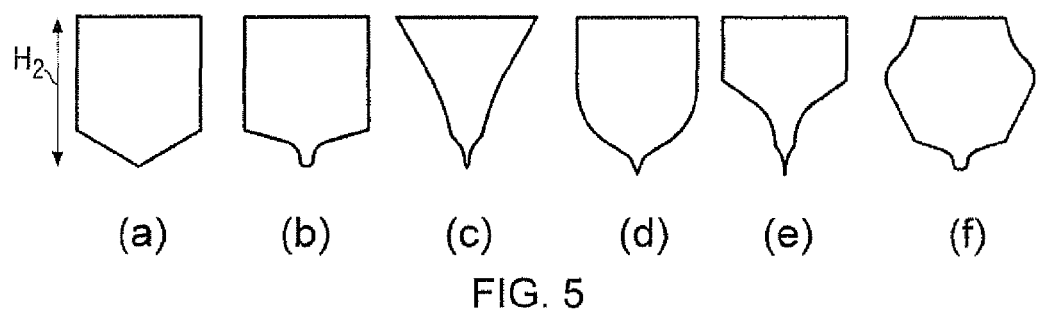
FIG. 5 shows possible cross-sections (a) to (f) of the pylon of FIG. 4.

FIG. 4 shows schematically a gas turbine engine 1 in which another pylon 5b attaches the engine to a wing (not shown) of an aircraft. The upper part of the pylon, which extends and attaches to the wing, is not shown in FIG. 4. The pylon 5b has an underside projection 13, the depth of the pylon, $H_1$, at the trailing edge 6 of the core fairing 3 being less than the depth of the pylon, $H_2$, at the point at which the bottom edges 10 of the side faces 9 merge at the axial distance L to form a single bottom edge 11. The projection extends downwardly to impinge on the exhaust gas discharged at the engine exhaust nozzle formed by the trailing edge 6 of the core fairing 3, in this way, the projection can alter the core flow from the engine. For example, the edges 10, 11 can increase shear and alter turbulence levels within the flow. FIG. 5 shows possible cross-sections (a) to (f) of the pylon 5b at distance L. Side faces 9 of cross-sections (d) and (f) have combinations of convex and concave curvature for precise control of the flow field around the pylon.

Figure 6:
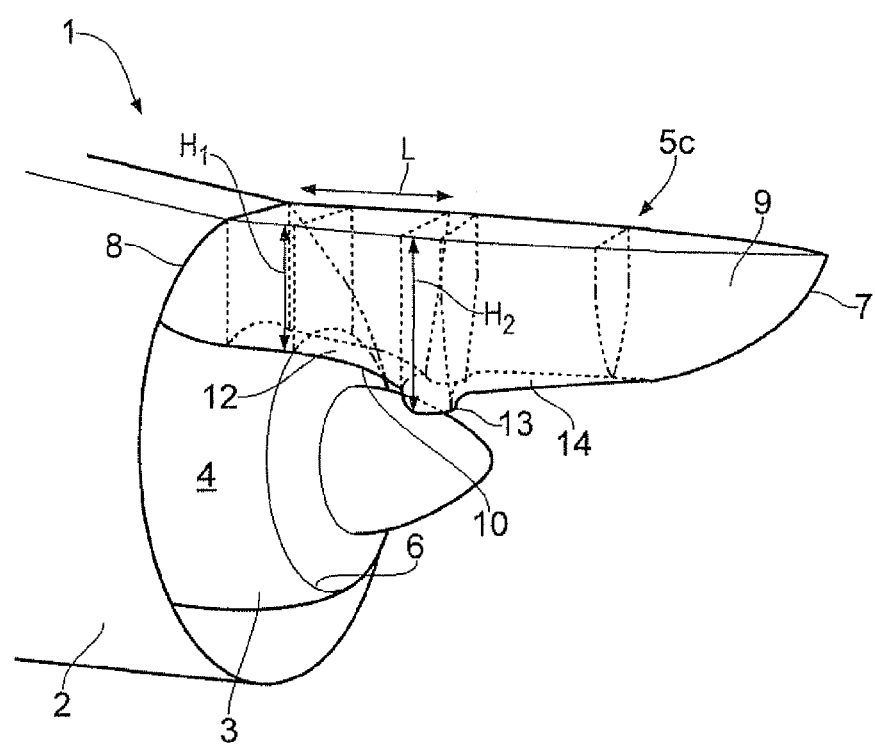
FIG. 6 shows schematically a gas turbine engine in which another pylon attaches the engine to a wing of an aircraft.

FIG. 6 shows schematically a gas turbine engine 1 in which another pylon 5c attaches the engine to a wing (not shown) of an aircraft. The upper part of the pylon, which extends and attaches to the wing, is not shown in FIG. 6. Unlike the pylons 5a and 5b of FIGS. 1 and 4, the bottom edges 10 of the side faces 9 do not merge to form a single bottom edge 11. Rather, the bottom edges continue separately to the bottom end of the trailing edge 7 of the pylon 5c, thereby forming a pair of spaced ridges. Between the ridges, a cut-out or channel 14 is formed which extends along the underside of the pylon. The ridges increase shear and alter turbulence levels within the flow.

In FIG. 6, the pylon 5c is shown with an underside projection 13 into the exhaust gas flow from the engine core. However, the spaced ridge arrangement can also be applied to pylons without such a projection. The ridges are then mainly used to alter the characteristics of the bypass flow from the bypass duct 4.

Figure 7:
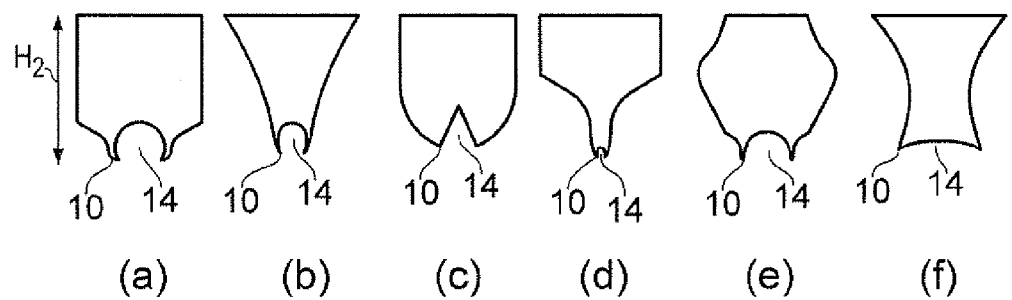
FIG. 7 shows possible cross-sections (a) to (f) of the pylon of FIG. 6.

FIG. 7 shows possible cross-sections (a) to (f) of the pylon 5c at distance L.

Figure 9:
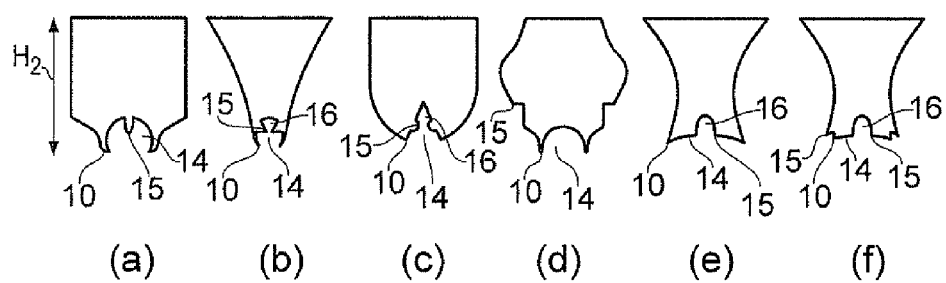
FIG. 9 shows possible cross-sections (a) to (f) of the pylon of FIG. 8.

FIG. 8 shows schematically a gas turbine engine 1 in which another pylon 5d attaches the engine to a wing (not shown) of an aircraft. The upper part of the pylon, which extends and attaches to the wing, is not shown in FIG. 8. Like the pylon 5c of FIG. 6, the bottom edges 10 of the side faces 9 of the pylon 5d continue separately to the bottom end of the trailing edge 7 to form a pair of spaced ridges with a cut-out or channel 14 formed therebetween. However, relative to the pylon 5c, the pylon 5d has a smaller underside projection 13. Also, as best shown in FIG. 9 which shows possible cross-sections (a) to (f) of the pylon 5d at distance L, the pylon 5d has one or more rearwardly extending further ridges 15 which make additional alterations to the characteristics of the surrounding flow. Preferably, the ridges are not located within the core flow. However, they may be used to alter the shear layer generated by the core and bypass flows. For example, the pylon 5d may have at least one pair of laterally-spaced, rearwardly extending further ridges 15 which define therebetween a rearwardly extending further channel 16, typically in the underside of the pylon, as shown in cross-sections (b), (c), (e) and (f). One or more of the further ridges 15 can be nested between the bottom edges 10, as shown in cross-sections (a), (b), (c), (e) and (f). Alternatively or additionally, one or more of the further ridges 15 can be on the side faces 9, as shown in cross-sections (d) and (f).

FIGS. 10(a) and (b) show schematically gas turbine engines 1 in which further pylons 5e, 5f attach the respective engine to a wing (not shown) of an aircraft. The upper parts of the pylons, which extend and attach to the wings, are not shown in FIGS. 10(a) and (b). The pylons 5e, 5f are similar to the pylon 5a of FIG. 1, in each case the bottom edges 10 of the side faces 9 merging to form a single bottom edge 11. However, in addition, from the top to the bottom side of each pylon the side faces are outwardly concave in a tip region 17 adjacent the trailing edge 7 of the pylon. FIG. 11 shows possible top side views (a) to (c) of the tip region. The concavity on each side in this region can cause the shear layer and the bypass flow on both side of the pylon to merge at an angle determined by the shape of the pylon. This can lead to a weakening of the shear layer strength and a change in turbulence level of the bypass flow. In addition, the concavity may contribute to deflection of the shear layer. Further, the concavity can have a direct effect on the turbulence within the boundary layer adjacent to the pylon.

To vary the effect of the tip region 17 on the flow, the tip region can extend different distances along the pylon. Thus the tip region of pylon 5e extends further along the pylon than the tip region of pylon 5f.

FIGS. 12(a) and (b) show schematically gas turbine engines 1 in which further pylons 5g, 5h attach the respective engine to a wing (not shown) of an aircraft. The upper parts of the pylons, which extend and attach to the wings, are not shown in FIGS. 12(a) and (b). The pylons 5g, 5h are similar to the pylons 5e, 5f of FIG. 10, in each case the side faces 9 being outwardly concave adjacent the trailing edge 7 of the pylon. However, in addition, the trailing edges of the pylons 5g, 5h each form at least one rearwardly directed "chevron" or projection 18 between the top and the bottom ends of the trailing edge.

The chevrons can enhance the mixing between the bypass flows on either side of the pylon. Different shapes of projection 18 can be used as shown in FIG. 13, which shows schematically enlarged views (a) to (d) of possible trailing edges 7 of the pylons 5g, 5h.

FIG. 14 shows schematically the rear section of another pylon 5i, also having rearwardly directed projections 18 between the top and the bottom ends of the trailing edge 7. The upper part of the pylon, which extends and attaches to the wing, is not shown in FIG. 14. However, in this case the projections are only formed on the portion of trailing edge between the bottom end of the trailing edge and a point approximately midway between the bottom and the top ends.

FIG. 15 shows schematically a gas turbine engine 1 in which another pylon 5j attaches the engine to a wing (not shown) of an aircraft. The upper part of the pylon, which extends and attaches to the wing, is not shown in FIG. 15. The pylon 5j also has rearwardly directed projections 18 between the top and the bottom ends of the trailing edge 7. However, in addition, between the trailing edge 6 of the core fairing 3 and the pylon trailing edge, the underside of the pylon forms a series of undulations 19 which are spaced from each other in the rearward direction of the engine. The undulations can extend over a significant axial distance and therefore provide an effective way of modifying the flow profile. In particular, jet mixing can be enhanced at a very early stage, and the large eddy scales characterising jet noise can be substantially altered.

FIG. 16 shows schematically the rear section of another pylon 5k, also having a series of undulations 19 on the underside of the pylon. The upper part of the pylon, which extends and attaches to the wing, is not shown in FIG. 16. However, in this case the undulations extend a shorter distance along the underside where the bottom edges 10 of the side faces 9 are merged to form a single bottom edge 11.

FIG. 17 shows schematically (a) the rear section of another pylon 5m, and (b) a cross-section through the pylon. The upper part of the pylon, which extends and attaches to the wing, is not shown in FIG. 17(a). Flow is controlled around the pylon by a plurality of side-by-side, rearwardly extending channels 20a formed on the side faces 9. Typically, each channel has a maximum width of about 1 cm. The channels can reinforce the reattachment of the flow on the pylon, thereby reducing the drag generated by the pylon.

FIG. 18 shows schematically (a) the rear section of another pylon 5n, and (b) a cross-section through the pylon. The upper part of the pylon, which extends and attaches to the wing, is not shown in FIG. 18(a). Again, flow is controlled around the pylon by a rearwardly extending channel 20b formed on one of the side faces 9. However, in this case the channel diverts fan air flow or free-stream air flow into the flow of exhaust gas from the core generator. The flow diversion, which is indicated by arrows in FIG. 18(a), can enhance the mixing of the bypass flow with the core flow, and also can provide some air cooling along the pylon that reduces the thermal stress of the exhaust flow on the pylon.

FIG. 19 shows a cross-section through the pylon 5d of FIG. 8. Channels 20c are formed on outwardly concave regions of the side faces 9 of the pylon. The edges of these channels form ridges which increase shear and alter turbulence levels within the flow.

FIG. 20 shows schematically a gas turbine engine 1 in which another pylon 5p attaches the engine to a wing 21 of an aircraft. The pylon has one or more openings 22 on the external surface thereof for discharging air. Some of the openings are positioned on the side faces 9 of the pylon adjacent the trailing edge 7 and discharge air rearwardly. Others are positioned on the side faces adjacent the trailing edge 8 of the fan nacelle and discharge air into the bypass flow. Yet others are positioned on the underside of the pylon and discharge air into the exhaust flow. The discharged air modifies the flow around the pylon, improving mixing of core and bypass flows and reducing jet noise. The discharged air can be taken from the engine compressor, and conveyed to the openings 22 by passages (not shown) through the pylon.

FIG. 21 shows schematically a gas turbine engine 1 in which another pylon 5q attaches the engine to a wing 21 of an aircraft. Again, the pylon has one or more openings 22 on the external surface thereof for discharging air. In this case, however, the flow of discharging air from the openings is produced through pressure gradients along respective passages 24 located inside the pylon. The entrance holes 23 of the passages are located in areas which have high total pressure relative to the static pressure of their respective discharge openings 22. The entrance holes may be NACA intake shaped to limit the drag and increase the efficiency of the air suction into the holes. Varying the relative areas of the entrance holes and discharge openings can allow the velocity of the discharged air to be increased or decreased. The entrance holes can be located where the flow is likely to detach, the suction at the holes helping to prevent or reduce detachment. Valves can be used to close the passages 24 if air flow from the entrance holes to the discharge openings is only desirable at certain engine operating conditions.

The discharge openings 22 can be any shape, e.g. rectangular, circular or elliptical. However, the area covered by the holes in general does not exceed 1/100th of the total area covered by the surface of the pylon.

The various pylons described above can be used to alter the characteristics of the shear layer and flow mixing. Different pylon configurations are proposed to achieve these effects. Not only can these configurations enable control of the flow mixing axially, during the development of jet noise sources, but they can also help to weaken the shear layer strength.

Overall, the pylons can provide an improved aerodynamic integration between the gas turbine, the pylon and the wing. Some of the configurations can enhance the mixing between the bypass and core flows, and can redistribute of the flow around the pylon. Air discharge openings in particular can be used to limit interaction of the shear layer with the flap or wing, and hence reduce or avoid the generation of secondary flows which can generate noise.

While the invention has been described in conjunction with the exemplary embodiments described above, many equivalent modifications and variations will be apparent to those skilled in the art when given this disclosure. For example, in a long cowl engine, where the trailing edge of the fan nacelle can be rearward of the trailing edge of the core fairing, the upper part of the pylon, which extends and attaches to the wing and which is not shown in many of the above drawings, can be more important for altering the bypass flow and the shear layer between the bypass flow and the flight stream. Thus pylon features for improving aerodynamics and/or decreasing noise generation may be applied to the upper part. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A pylon for attachment of a gas turbine engine to a wing of an aircraft, the gas turbine engine comprising a core fairing surrounding a core generator and defining a nozzle for discharging a core gas flow, and a fan nacelle surrounding the core fairing to define an annular bypass duct therebetween for discharging fan air;

the pylon having a trailing edge which is rearward of the trailing edge of the core fairing and the trailing edge of the fan nacelle, and further having two laterally-spaced side faces which span the bypass duct between the fan nacelle and the core fairing and extend in the rearward direction of the engine to end at the trailing edge of the pylon, each side face having a bottom edge which extends in a rearward direction of the engine from the core fairing to the bottom end of the trailing edge of the pylon;

wherein the bottom edges merge at a merging position between the trailing edge of the core fairing and the trailing edge of the pylon such that the bottom edges form a single bottom edge from the merging position to the bottom end of the trailing edge of the pylon; and wherein the laterally-spaced side faces are outwardly concave adjacent the trailing edge of the pylon.

2. A pylon according to claim 1, wherein one or more rearwardly extending channels are formed on one or both of the side faces.

3. A pylon according to claim 2, wherein the one or more channels are configured to divert fan air flow or free-stream air flow into the core gas flow.

4. A pylon according to claim 1, wherein between the trailing edge of the core fairing and the pylon trailing edge, the pylon has an underside projection which extends downwardly to impinge on the core gas flow discharged from the nozzle.

5. A pylon according to claim 1, wherein between the trailing edge of the core fairing and the pylon trailing edge, the underside of the pylon has a pair of laterally-spaced, rearwardly extending first ridges which define therebetween a rearwardly extending channel in the underside of the pylon.

6. A pylon according to claim 5, wherein, between the trailing edge of the core fairing and the pylon trailing edge, the pylon has one or more rearwardly extending further ridges.

7. A pylon according to claim 6, wherein the pylon has at least one pair of the further ridges, the pair being laterally-spaced and defining therebetween a rearwardly extending further channel.

8. A pylon according to claim 1, wherein the pylon trailing edge forms at least one rearwardly directed projection between the top and the bottom ends of the pylon trailing edge.

9. A pylon according to claim 1, wherein, between the trailing edge of the core fairing and the pylon trailing edge, the underside of the pylon forms a series of undulations which are spaced from each other in the rearward direction of the engine.

* * * * *